(12) United States Patent
Haghani

(10) Patent No.: US 12,078,982 B2
(45) Date of Patent: Sep. 3, 2024

(54) METHODS AND SYSTEMS FOR WORKPIECE QUALITY CONTROL

(71) Applicant: Siemens Aktiengesellschaft, Munich (DE)

(72) Inventor: Adel Haghani, Hamburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/908,679

(22) PCT Filed: Feb. 17, 2021

(86) PCT No.: PCT/EP2021/053882
§ 371 (c)(1),
(2) Date: Sep. 1, 2022

(87) PCT Pub. No.: WO2021/175593
PCT Pub. Date: Sep. 10, 2021

(65) Prior Publication Data
US 2023/0117055 A1    Apr. 20, 2023

(30) Foreign Application Priority Data
Mar. 5, 2020   (EP) .................................... 20161233

(51) Int. Cl.
*G05B 19/418*   (2006.01)
(52) U.S. Cl.
CPC ............... *G05B 19/41875* (2013.01); *G05B 2219/32188* (2013.01); *G05B 2219/37513* (2013.01)
(58) Field of Classification Search
CPC .... G05B 19/41875; G05B 2219/32188; G05B 2219/37513
(Continued)

(56) References Cited

U.S. PATENT DOCUMENTS 11,475,998 B2*  10/2022  Musgrove .............. A61B 5/361
2006/0155661 A1  7/2006  Morgan
(Continued)

FOREIGN PATENT DOCUMENTS

EP    1 473 667 A2    11/2004
EP    1 927 829 A2    6/2008
(Continued)

OTHER PUBLICATIONS

J. An, et. al., "variational autoencoder based anomaly detection using reconstruction probability", Feb. 2015 Special Lecture on IE, SNU Data Mining Center (Year: 2015).*
(Continued)

*Primary Examiner* — Thomas C Lee
*Assistant Examiner* — Michael Tang
(74) *Attorney, Agent, or Firm* — Henry M. Felereisen LLC

(57) ABSTRACT

A computer-implemented method for providing a trained function for performing a workpiece quality control includes receiving a plurality of training machining datasets, wherein different training high-frequency machining datasets are representative for the quality of different workpieces, transforming the plurality of training machining datasets into the time-frequency domain to generate a plurality of training time-frequency domain datasets, and training a function based on the plurality of training time-frequency domain datasets, wherein the function is based on an autoencoder. The autoencoder has input layers, output layers and a hidden layer. The plurality of training time-frequency domain datasets are provided to the input layers and the output layers during training, and a trained autoencoder function is outputted.

7 Claims, 4 Drawing Sheets

(58) Field of Classification Search
USPC .......................................................... 700/109
See application file for complete search history.

(56) References Cited

U.S. PATENT DOCUMENTS

| | | |
|---|---|---|
| 2008/0127793 A1 | 6/2008 | Ikeda |
| 2008/0215514 A1 | 9/2008 | Morgan |
| 2019/0228312 A1* | 7/2019 | Andoni ............... G06F 18/2433 |
| 2019/0302707 A1 | 10/2019 | Guo et al. |
| 2020/0133257 A1* | 4/2020 | Cella ................. G05B 19/4183 |
| 2020/0209109 A1* | 7/2020 | Liang ..................... G06N 3/044 |
| 2020/0394092 A1* | 12/2020 | Satou .................. G06F 11/0766 |
| 2021/0034918 A1* | 2/2021 | Schaefer .............. G06V 10/454 |
| 2021/0257049 A1* | 8/2021 | Abeliuk ................ G06N 3/045 |

FOREIGN PATENT DOCUMENTS

| | | | | |
|---|---|---|---|---|
| JP | 2019204321 A | * | 11/2019 | ............ G01N 21/88 |
| WO | WO 1995-011488 A1 | | 4/1995 | |
| WO | WO-9511488 A1 | * | 4/1995 | ....... G01R 31/31915 |
| WO | WO-2017165551 A1 | * | 9/2017 | ............ G10L 15/02 |

OTHER PUBLICATIONS

Autoencoder—Wikipedia Feb. 13, 2019 (Year: 2019).*
B. Larzalere, "LSTM Autoencoder for Anomaly Detection", Towards Data Science, Sep. 25, 2019 (Year: 2019).*
P. Park, et. al., "Fault Detection and Diagnosis Using Combined Autoencoder and Long Short-Term Memory Network", Sensors 2019, 19, 4612. (Year: 2019).*
PCT International Search Report and Written Opinion of International Searching Authority mailed Apr. 23, 2021 corresponding to PCT International Application No. PCT/EP2021/053882 filled Feb. 17, 2021.

* cited by examiner

METHODS AND SYSTEMS FOR WORKPIECE QUALITY CONTROL

CROSS-REFERENCES TO RELATED APPLICATIONS

This application Is the U.S. National Stage of International Application No. PCT/EP2021/053882, filed Feb. 17, 2021, which designated the United States and has been published as International Publication No. WO 2021/175593 A1 and which claims the priority of European Patent Application, Serial No. 20161233.0, filed Mar. 5, 2020, pursuant to 35 U.S.C. 119(a)-(d).

BACKGROUND OF THE INVENTION

The invention relates to a computer-implemented method for providing a trained function for performing a workpiece quality control.

Moreover, the invention relates to a computer-implemented method for performing a workpiece quality control.

Furthermore, the invention relates to a computer program for providing a trained function and to a computer program for performing a workpiece quality control.

Moreover, the invention relates to a system for providing a trained function for performing a workpiece quality control and to a system for performing a workpiece quality control.

In the state-of-the-art solutions, the data from reference workpieces are used to find a threshold for acceptable range of the signals. During the production, those thresholds are used and when the signals exceed the thresholds, an alarm will indicate that a quality deviation happened in the workpiece. This needs an exact preprocessing of the signals (e.g. filtering, etc.), which requires domain expert knowledge.

Accordingly, there is a need to provide for methods and systems that reduce the amount of experts' presence and data handling such as preprocessing, filtering etc.

SUMMARY OF THE INVENTION

In order to achieve the objective mentioned above, the present invention provides a computer-implemented method for providing a trained function for performing a workpiece quality control comprising:
  receiving a plurality of training high-frequency machining datasets, wherein different training high-frequency machining datasets are representative for the quality of different good quality workpieces,
  transforming the plurality of training high-frequency machining datasets into a plurality of datasets on a time-frequency domain to achieve a plurality of training time-frequency domain datasets,
  training a function based on the plurality of training time-frequency domain datasets, wherein the function is based on an autoencoder, wherein the autoencoder comprises at least one input layer, at least one output layer and a hidden layer, wherein the training comprises
    providing each of the plurality of training time-frequency domain datasets for the input and for the output layer,
  providing the trained function.

It will be appreciated that for training purposes the workpieces of a predetermined quality can be selected. The operator selects workpieces of good quality, e.g. the workpieces that had been tested regarding their quality otherwise and passed this other quality test. Preferably the operator selects only those workpieces that have good quality.

Using the autoencoder—unsupervised machine learning algorithm—can reduce the need of expert's presence and/or input.

High-frequency dataset usually comprise time-series data collected at an extremely fine scale. "Extremely fine" means milliseconds, for example 1 to 50 milliseconds, in particular 1 to 40 milliseconds, more particularly 1 to 30 milliseconds. In an embodiment the data (for training purposes or for purposes of the quality analysis of a workpiece) can be sampled every 2 milliseconds.

Each high-frequency machining dataset represents the quality of a workpiece. The corresponding time-series data can be in form of a signal, which is generated by measuring a parameter, for example a spindle torque, a spindle motor current, control deviation signal, etc. The parameter which is measured can be selected by the user/operator.

In an embodiment, the autoencoder can be a variational autoencoder (VAE) and the training can comprise specifying a statistical distribution for the hidden layer. Using the VAE gives an advantage that the amount of expert's knowledge is further reduced.

In an embodiment, the statistical distribution can be a normal distribution, for example a normal distribution with zero mean and the variance equal to one. In an embodiment the statistical distribution can be a uniform distribution.

In an embodiment the training high-frequency machining datasets can be based on time-series CNC machining data.

In an embodiment the transforming can be performed by means of a wavelet transformation.

In an embodiment each training high-frequency machining dataset is transformed.

Good results can be achieved, if the autoencoder is a recurrent neural network, for example—a long short-term memory network.

Furthermore, the objective mentioned above is achieved by providing a computer-implemented method for performing a workpiece quality control, comprising:
  receiving a high-frequency machining data, wherein the high-frequency machining dataset is representative for a quality of a workpiece, for example the high-frequency machining dataset is based on time-series CNC machining data,
  transforming the high-frequency machining dataset into a dataset on a time-frequency domain to achieve a time-frequency domain dataset,
  applying a trained autoencoder function comprising a hidden layer to the time-frequency domain dataset, wherein data in the hidden layer of the autoencoder function is generated,
  analyzing a quality of the at least one workpiece based on the data generated in the hidden layer of the autoencoder function,
  providing results of the analysis.

Using of autoencoders in the monitoring of the quality of the workpieces can capture the nonlinearity, which exist in the data and reduce the false alarm and miss-detection rates.

In an embodiment the autoencoder can comprise an encoder with an input layer and a decoder with an output layer.

In an embodiment the encoder and the decoder can comprise additional layers. Adding more layers may help to achieve better results for complex cases.

In an embodiment the method can further comprise repeating the said steps for other workpieces.

In an embodiment a variational autoencoder (VAE) with a specified statistical distribution for the hidden layer can be used for the workpiece quality control. In this case, the analyzing the quality of the at least one workpiece can comprise comparing the data generated in the hidden layer of the VAE with the specified statistical distribution. The user or the operator does not need to set up parameters to use the VAE and its dependency on expert knowledge is even lesser.

In an embodiment, the statistical distribution can be a normal distribution, for example a normal distribution with mean value equal to zero and variance equal to one, or uniform distribution.

In an embodiment, the transforming can be performed by means of the wavelet transformation. Using the wavelet transformation may reduce the need of filtering and preprocessing of the data.

In an embodiment, the autoencoder can be a recurrent neural network (RNN), more particularly a long short-term memory (LSTM) network.

The above-mentioned objective is also achieved by providing a computer program for providing a trained function comprising instructions which, when the program is executed by a computing platform, cause the computing platform to carry out the said training method.

The above-mentioned objective is also achieved by providing a computer program for performing a workpiece quality control comprising instructions which, when the program is executed by a computing platform, cause the computing platform to carry out the said workpiece-quality-control-method.

The said computer program(s) can be designed as app, for example as cloud-app. In an embodiment, the above-mentioned parameters, which are measured to obtain high-frequency datasets can be selected by the app user. This includes both training and utilization (workpiece quality control analysis) methods mutatis mutandis.

The above-mentioned objective is also achieved by a (training) system for providing a trained function for performing a workpiece quality control, comprising:
- a first training interface, e.g. an edge computing device, configured for receiving a plurality of training high-frequency machining datasets, wherein different training high-frequency machining datasets are representative for the quality of different workpieces,
- a second training interface, e.g. a computing system, more particularly, one or more server(s), e.g. PCs and/or cloud servers, configured for providing the trained function,
- a training computation apparatus, e.g. a computing system, more particularly, one or more server(s), e.g. PCs and/or cloud servers, configured for
    - transforming the plurality of training high-frequency machining datasets into a plurality of datasets on a time-frequency domain to achieve a plurality of training time-frequency domain datasets,
    - training a function based on the plurality of training time-frequency domain datasets, wherein the function is based on an autoencoder, wherein the autoencoder comprises at least one input layer, at least one output layer and a hidden layer, wherein the training comprises
    - providing the training time-frequency domain dataset for the at least one input and for the at least one output layer.

The above-mentioned objective is also achieved by a (analyzing) system for performing a workpiece quality control, comprising:
- a first interface, e.g. an edge computing device, configured for receiving a high-frequency machining dataset, wherein the high-frequency machining dataset is representative for a quality of a workpiece, in particular the high-frequency machining dataset is based on time-series CNC machining data,
- a second interface, configured for providing results of the analysis, e.g. human machine interface (HMI), in particular CNC control panel, PC, mobile device, in particular smartphone or tablet, etc.
- a computation apparatus, e.g. an edge computing device, a PC, server, cloud server or alike, configured for
    - transforming the high-frequency machining dataset into a dataset on a time-frequency domain to achieve a time-frequency domain dataset,
    - applying a trained autoencoder function comprising a hidden layer to the time-frequency domain dataset, wherein data in the hidden layer of the autoencoder function is generated,
    - analyzing a quality of the at least one workpiece based on the data generated in the hidden layer of the autoencoder function.

Such system can improve the efficiency and performance of the industrial machines, especially of the CNC machines.

In an embodiment the first interface can be further configured for receiving a high-frequency machining dataset from further workpieces and the computation apparatus can be further configured for repeating the said steps for performing quality control of the further workpieces.

In an embodiment a computer-readable, in particular non-transitory medium can be provided, which medium comprises instructions which, when executed by a analyzing/training system, cause the analyzing/training system to carry out at least one of the said methods.

BRIEF DESCRIPTION OF THE DRAWING

The above and other objects and advantages of the invention will be apparent upon consideration of the following detailed description, taken in conjunction with the accompanying drawings, in which like reference characters refer to like parts throughout, and in which.

DETAILED DESCRIPTION OF PREFERRED EMBODIMENTS

Figure 1:
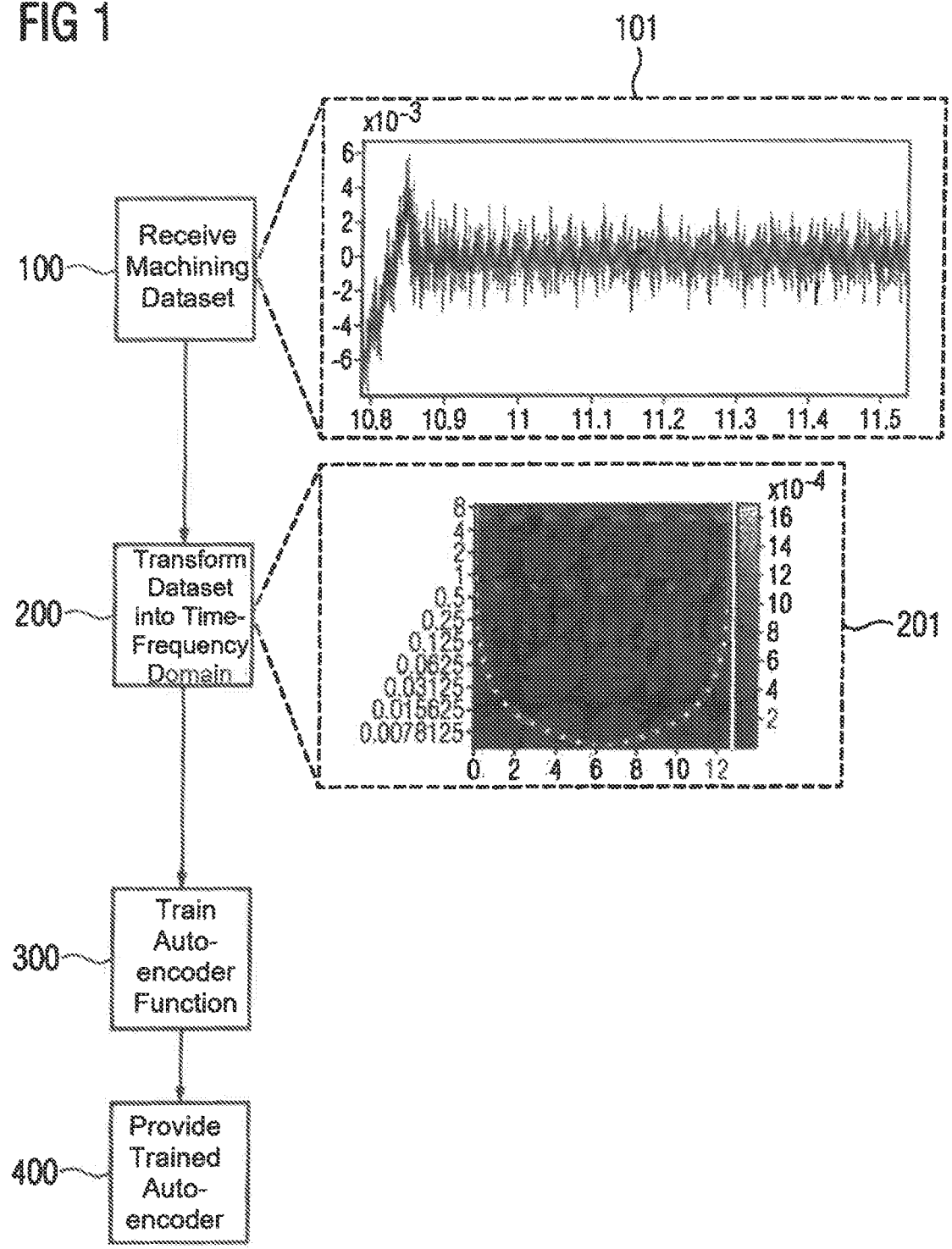
FIG. 1 is a flow diagram of an example of a computer-implemented method for providing a trained function for performing a workpiece quality control.

Turning to FIG. 1, a flow diagram of an example of a computer-implemented method for providing a trained function for performing a workpiece quality control is illustrated.

In the first step a training high-frequency machining dataset is received 100. The training high-frequency machining data is representative of machining data, e.g. machining signals, from good quality workpieces or reference workpieces.

Receiving 100 may be performed by means of a first interface, which for example can be designed as an edge computing device. In an embodiment of the invention the training high-frequency machining dataset can be based on time-series CNC (Computerized Numerical Control) machining data. In an embodiment the machining data can comprise a plurality of time-series machining signals 101, where on the x-axis the time in seconds is depicted and the y-axis represents spindle torque. The time series machining signal 101 comprises measured values of a measured quantity (bold black line), e.g. of the spindle torque, and an acceptable range of the measured value (grey area surrounding the bold black line). To obtain the machining signal 101 the data is sampled from corresponding machine sensors every 2 milliseconds. It will be appreciated that other sampling intervals are possible, e.g. 5, 10, 15 ms etc., as well as other parameters can be measured, e.g. spindle motor current, control deviation signal etc.

The training dataset is then transformed 200 into a dataset on a time-frequency domain to achieve a training time-frequency domain dataset. In an embodiment the 1D high-frequency time-series machining signals from the training dataset can be transformed by means of a wavelet transformation. An example of a transformed signal 201 in the time-frequency domain (2D signal) is illustrated in FIG. 1. The x-label is time in seconds. The y-label is frequency in Hertz (Hz). It will be appreciated that the time axis can be transferred for example to path axis, where path is the distance which tool travels over the workpiece to perform the operation.

The reference signals on the time-frequency domain 201 are used for training 300 an autoencoder function 310. The (2D) training signals are given for an input 311 and an output layer 312 of the autoencoder 310 (see FIG. 2) in order to train it.

Transforming 200 of the high-frequency time-series data (1D signals) and training 300 of the encoder can be performed by means of a computation apparatus, a computation unit, a computing platform. In an embodiment the (untrained or trained) autoencoder can be stored on the computing platform or, e.g. in a memory of the computation apparatus.

After training the autoencoder, the trained autoencoder is provided 400. Providing 400 the trained autoencoder can be performed by means of a second interface. Providing the trained autoencoder can comprise for example notifying an operator of the machine, e.g. of the CNC machine, that the autoencoder has been trained and is ready for use. The notifying can be performed in various ways. For example, the operator can receive a notification via email or as a push message on his\her mobile device or as an alarm on a CNC control panel.

Figure 2:
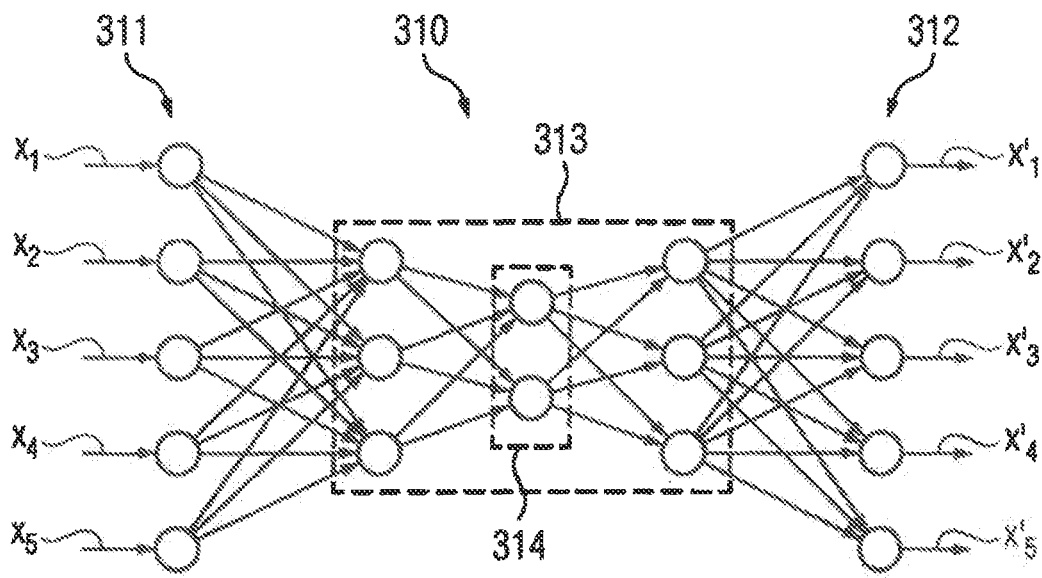
FIG. 2 is an example of the structure of an autoencoder.

Turning to FIG. 2, an example of the structure of the autoencoder 310 is illustrated. The autoencoder 310 comprises an input layer 311, an output layer 312, and a hidden layer 314. The variables $x_1, \ldots x_5$ can be fed into neurons of the input layer 311 and the variables $x^1_1, \ldots x^1_5$ are fed interneurons of the output layer 312. A reduced representation of the input data can be generated in one of the (intermediate) layers 313, which comprise the hidden layer 314 and optionally one or more convolutional layers. The hidden layer 314 can have the minimal number of neurons.

The variables $x_1, \ldots, x_5$ can represent single signals. As explained above, in the prior art solutions threshold for acceptable range had to be found for each single signal $x_1$, $\ldots, x_5$. This needs an exact preprocessing of the signals (example given filtering, etc.) which requires domain expert knowledge.

Using the autoencoder 310 reduces the complexity of the problem, since the thresholds are to be found only for the (data at the neurons of the) hidden layer 314 with the reduced representation of the signals.

Good results can be achieved if the autoencoder is a recurrent neural network (RNN), more particularly a long short-term memory (LSTM) network.

In an embodiment the autoencoder 310 can be a variational autoencoder (VAE). In this case a statistical distribution for the hidden layer 314 is specified during the training 300 of the encoder.

In an embodiment, the autoencoder 310 can comprise an encoder, wherein the encoder can comprise one or more layers, and a decoder, wherein the decoder can comprise one or more layers. The hidden layer can comprise one or more layers as well. In an embodiment the layer(s) of the hidden layer can comprise two neurons. The input layer 311 and the output layer 312 can comprise 32 neurons.

In an embodiment the statistical distribution can be a normal distribution. Good results can be achieved, if the normal distribution's mean value is equal to zero and its variance is equal to one—$N(0,1)$. The statistical distribution can be for example a uniform distribution.

In one embodiment a (training) computer program is provided. The computer program comprises instructions which, when the program is executed by a computing platform, cause the computing platform to carry out the method for providing the trained autoencoder as explained above. The computing platform can comprise an edge computing device, cloud computing device, smartphone, PC etc. The computer program can be designed as an app running on an edge device or on a cloud server.

Figure 3:
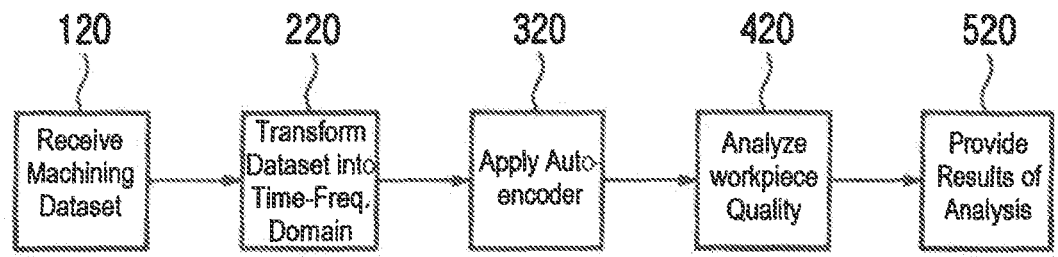
FIG. 3 is a flow diagram of an example of a computer-implemented method for performing a workpiece quality control.

Turning to FIG. 3, a flow diagram of an example of a computer-implemented method for performing a workpiece quality control is illustrated.

In the first step a high-frequency machining dataset from at least one workpiece is received 120. For example, the high-frequency machining dataset can be collected for a workpiece, which is currently under processing. In particular, the high-frequency machining dataset can be based on time-series CNC machining data collected, while machining the workpiece.

In the second step the high-frequency machining dataset is transformed 220 into a dataset on a time-frequency domain to achieve a time-frequency domain dataset. This transformation 220 can be performed, when the processing of the workpiece is finished, the corresponding data is collected, and the high-frequency machining dataset is received 120. In an embodiment, the transformation 220 can be performed by a wavelet transformation. Using the wavelet transformation may reduce the need of filtering and preprocessing of the data.

In the third step a trained autoencoder function is applied 320 to the time-frequency domain dataset. The trained autoencoder function can be an autoencoder function 310 provided by the training method described regarding FIG. 1 and FIG. 2.

The trained autoencoder function comprises a hidden layer. When the trained autoencoder function is applied to the time-frequency domain data set, data in the hidden layer 314 of the autoencoder function is generated.

Further on, analysis of a quality of the at least one workpiece based on the data generated in the hidden layer 314 of the autoencoder function 310 is performed 420.

For example, threshold values for the representation of the time frequency domain signal in the hidden layer can be determined based on the domain expert knowledge.

In an embodiment the autoencoder can be a variational autoencoder VAE with a specified statistical distribution for the hidden layer. In this case the analysis of the quality of the at least one workpiece can be carried out by comparing the data generated in the hidden layer 314 of the autoencoder function 310 (factual statistical distribution) with the specified statistical distribution. All the good quality workpieces will generate a signal in the reduced dimension (in the hidden layer 314), which follows the specified statistical distribution, whereas the bad quality workpieces will have deviation compared to the reference (specified) distribution.

In an embodiment the specified statistical distribution can be a normal distribution, in particular a normal distribution with mean value equal to zero and variance equal to one, or the uniform distribution.

Surprisingly good results can be achieved, if the autoencoder 310 is a recurrent neural network (RNN), in particular a long short-term memory (LSTM) network.

In the next step the results of the analysis are provided 520. In an embodiment the providing 520 can comprise alarming an operator of the machine, for example of the CNC machine, if the analyzed workpiece cannot be verified to be a workpiece of a good quality.

In this case the operator may receive an alarm (on a CNC control panel), an email (on his/her mobile device, e.g. smartphone), a push message (on his/her mobile device, e.g. smartphone) etc. that notifies him/her that the analyzed workpiece seems to be of bad quality and needs to be further investigated.

In an embodiment the method can comprise a further step of repeating the steps 120 to 520 for other workpieces.

The result of the analysis can be an assessment that the work piece is good or otherwise needed to be further investigated.

In one embodiment a computer program is provided. The computer program comprises instructions which, when the program is executed by a computing platform, cause the computing platform to carry out the method for performing the workpiece quality control as explained above. The computing platform can comprise an edge computing device, cloud computing device, smartphone, PC etc. The computer program can be designed as an app running on an edge device or on a cloud server.

Figure 4:
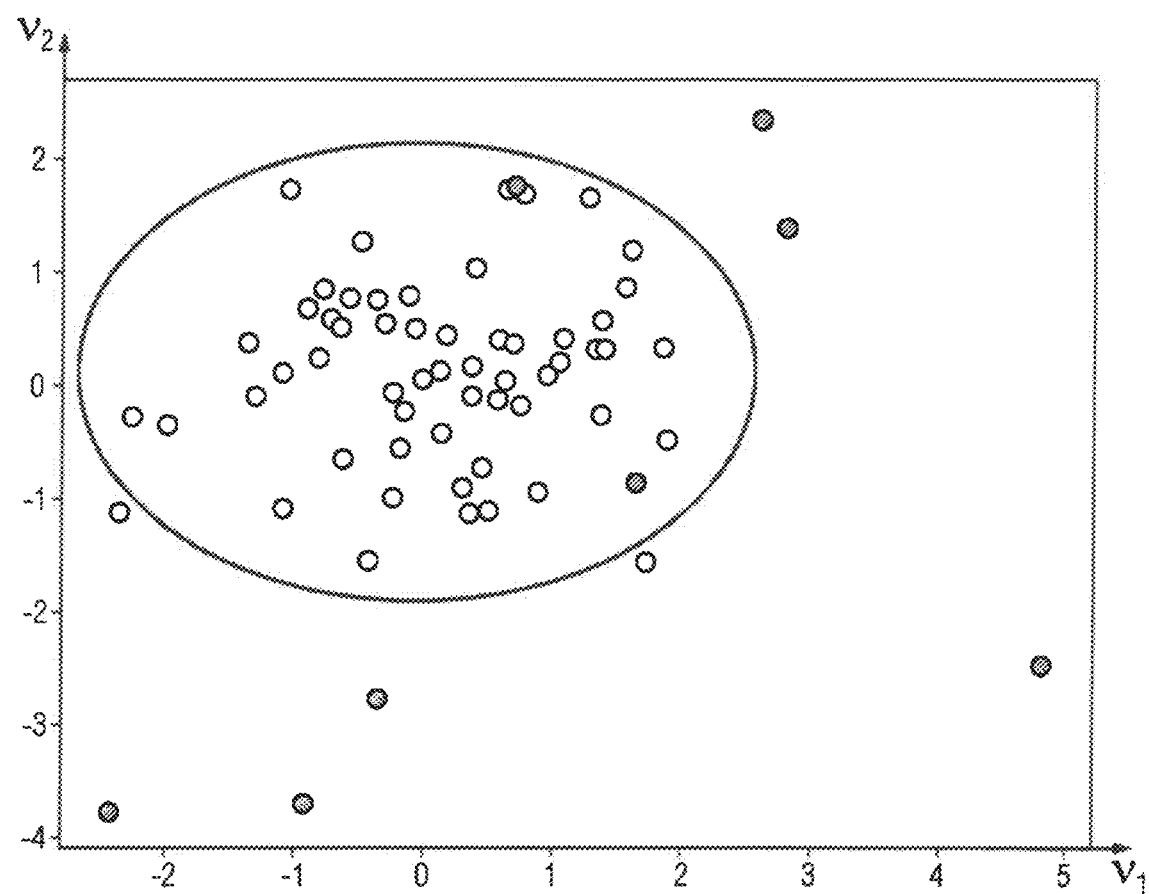
FIG. 4 is an example of results of the analysis performed according to the method of FIG. 3, FIG. 5 an example of a training system, and FIG. 6 an example of an analyzing system.

FIG. 4 illustrates results of such analysis. The desired distribution is set here to bivariate Gaussian distribution with zero mean and unit variance. Data from 20 workpieces was used to train the variational autoencoder function. For monitoring/performing a quality control a set of data (containing data from good and bad quality workpieces) is used. The result shows that the VAE can distinguish between the good and bad quality workpieces with a good performance/precision. This shows that the method performs well with only few (30, 20 or less) training samples.

Figure 5:
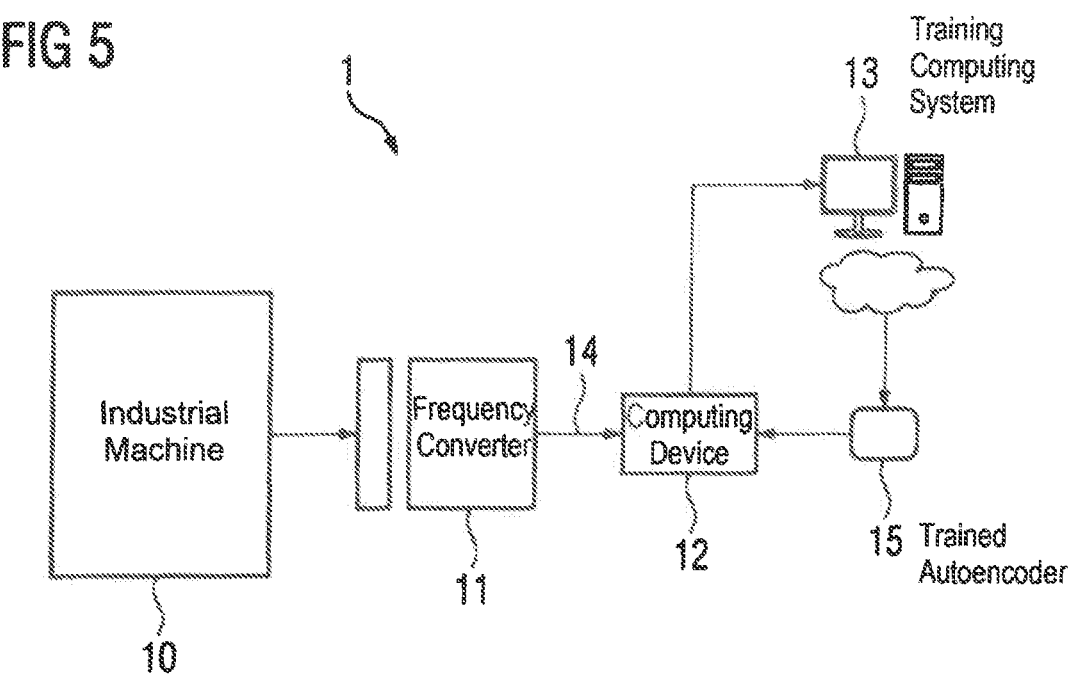
Figure 6:
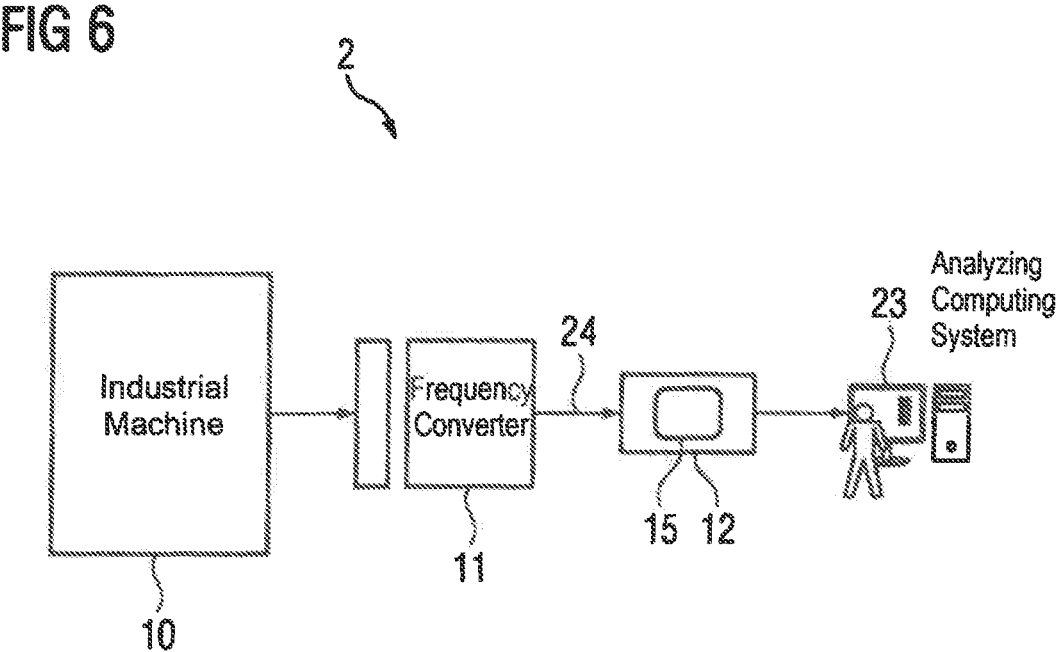

Turning to FIG. 5, an example of a (training) system 1 for providing a trained function for performing a workpiece quality control is illustrated. In an embodiment the system 1 can comprise an industrial machine 10, e.g. for milling, boring etc. The industrial machine 10 may carry a frequency converter apparatus 11. In an embodiment the frequency converter apparatus 11 may comprise two or more separate units (FIG. 5 and FIG. 6 show for example two separate units). In an embodiment the frequency converter apparatus 11 can be arranged on the industrial machine 10 or located apart from the industrial machine 10. The system may also comprise a computing device 12, e.g. an edge computing device, and a training computing system 13, which can be based on a computing platform, more particularly on a cloud computing platform. The industrial machine 10, the frequency converter apparatus 11, the computing device 12 and the training computing system 13 are configured to be connected to each other via data links. An exemplary data flow is shown with arrows.

High-frequency time-series training data 14 is send from the frequency converter apparatus 11 to the computing device 12. The transformation of the high-frequency time-series training data 14 into to time-frequency domain can be performed for example by the computing device 12 or by the training computing system 13. The above-mentioned training computer program can be stored on the training computing system 13. The training computing system 13 can be located in the same industrial plant as the industrial machine 10 or be partially (it can be connected to a cloud server) or entirely in a cloud.

After the autoencoder 310 is trained by the training computing system 13 a trained autoencoder 15 can be deployed on the computing device 12.

Turning to FIG. 6, an example of a system 2 for performing a workpiece quality control is illustrated.

The system 2 can comprise the industrial machine 10, the frequency converter apparatus 11, the computing device 12 of FIG. 1 and an analyzing computing system 23, which are configured to be connected to each other via data links. An exemplary data flow is shown with arrows. The analyzing computing system 23 can be based on a computing platform, more particularly on a cloud computing platform.

High-frequency time-series data 24 from a workpiece, which is being currently analyzed, is send from the frequency converter apparatus 11 to the computing device 12. The transformation of the high-frequency time-series data 24 into to time-frequency domain can be performed for example by the computing device 12 or by the analyzing computing system 23.

The above-mentioned computer program for carrying out the method for performing a workpiece quality control can be stored on the analyzing computing system 23 or on the computing device 12 and be remotely accessible by the analyzing computing system 23. The analyzing computing system 23 can be located in the same industrial plant as the industrial machine 10 or be partially (it can be connected to a cloud server) or entirely in a cloud. The analyzing computing system 23 can comprise a man-machine interface or user interface for operating the computer program.

The trained autoencoder 15 can be stored on the computing device 12.

The results of analyzing workpiece(s) can be displayed by means of the analyzing computing system 23. The analyzing computing system 23 can comprise a mobile device for displaying the results of the performed quality analysis. The operator may be notified of the state of the analyzed workpiece via an alarm, an email, a push message etc. The notification can be designed in a traffic light manner (see FIG. 6). Each color can correspond to a certain quality of the workpiece.

As mentioned above, the type of parameters which are measured in order to provide training data or data for the analysis of the quality of workpiece(s) can be chosen during the training process or before or during the analysis.

For example, the choice of the parameters can be performed by an operator in the app on his smartphone. The app can comprise both a training mode (for training and Autoencoder function) and an analyzing mode (for analyzing the workpiece under machining).

The above described embodiments of the present disclosure are presented for purposes of illustration and not of limitation.

In particular, the embodiments described with regard to figures are only few examples of the embodiments described in the introductory part.

The solution according to the invention is described above with respect to the claimed providing systems as well as with respect to the claimed methods. Features, advantages or alternative embodiments herein can be assigned to the other claimed objects and vice versa. In other words, claims for the providing systems can be improved with features described or claimed in the context of the methods. In this case, the functional features of the method are embodied by objective units of the providing system.

Furthermore, in the following the solution according to the invention is described with respect to methods and systems for training an autoencoder function as well as with respect to methods and systems for performing a workpiece quality control. Features, advantages or alternative embodiments herein can be assigned to the other claimed objects and vice versa. In other words, claims for methods and systems for training an autoencoder function can be improved with features described or claimed in context of the methods and systems for performing the quality analysis, and vice versa.

In particular, the trained autoencoder function (algorithm) of the methods and systems for checking the quality of the workpiece can be adapted by the methods and systems for training. Furthermore, the input data can comprise advantageous features and embodiments of the training input data, and vice versa. Furthermore, the output data can comprise advantageous features and embodiments of the output training data, and vice versa.

The reference signs in the claims used only for clarity purposes and shall not be considered to be a limiting part of the claims.

What is claimed is:

1. A computer-implemented method for providing a trained function and for performing a workpiece quality control, said computer-implemented method comprising:
   receiving a plurality of training machining datasets, wherein different training machining datasets are representative of different workpieces having an acceptable quality based on prior tests;
   transforming the plurality of training machining datasets into a time-frequency domain to produce a plurality of training time-frequency domain datasets;
   training, based on the plurality of the training time-frequency domain datasets, a function based on an autoencoder, which comprises an input layer, an output layer and a hidden layer, by providing the input layer and the output layer with each of the plurality of training time-frequency domain datasets; providing the trained function as a trained autoencoder function-for; and
   performing the workpiece quality control based on the trained autoencoder function, comprising:
      receiving a machining dataset based on time-series CNC machining data, wherein the machining dataset is representative for a quality of a workpiece;
      transforming the machining dataset into a time-frequency domain to produce a time-frequency domain dataset;
      applying the trained autoencoder function to the time-frequency domain dataset and generate data in the hidden layer;
      analyzing the quality of the workpiece based on the data generated in the hidden layer of the trained autoencoder function; and
      providing results of the analysis, wherein the autoencoder is a variational autoencoder with a specified statistical distribution for the hidden layer, and wherein the analyzing the quality of the workpiece comprises comparing the data generated in the hidden layer of the variational autoencoder with the specified statistical distribution.

2. The computer-implemented method of claim 1, wherein the training machining datasets are based on time-series CNC machining data.

3. The computer-implemented method of claim 1, wherein the statistical distribution is a normal distribution, in particular a normal distribution with mean value equal to zero and variance equal to one, or uniform distribution.

4. The computer-implemented method of claim 1, wherein the transforming is performed by means of the wavelet transformation.

5. The computer-implemented method of claim 1, wherein the autoencoder is a recurrent neural network, in particular a long short-term memory network.

6. A computer program product comprising a computer program stored on a non-transitory computer-readable medium and comprising instructions which, when the program is loaded into a memory of a computing platform and executed by a processor of the computing platform, causes the computing platform to carry out the method of claim 1.

7. A system for providing a trained function and for performing a workpiece quality control, said system comprising:
   a first training interface, implemented by one or more processors, configured to receive a plurality of training machining datasets, wherein different training machining datasets are representative of different workpieces having an acceptable quality based on prior tests;
   a training computation apparatus, implemented by one or more processors, configured to
      transform the plurality of the training machining datasets into a time-frequency domain to generate a plurality of training time-frequency domain datasets,
      train, based on the plurality of training time-frequency domain datasets, a function based on an autoencoder, which comprises an input layer, an output layer and a hidden layer,
      provide the training time-frequency domain datasets for the input layer and for the output layer;
   a second training interface, implemented by one or more processors, configured to provide the trained function as a trained autoencoder function; and
   performing the workpiece quality control based on the trained autoencoder function, comprising:
   a first interface, implemented by one or more processors, receiving a machining dataset based on time-series CNC machining data, wherein the machining dataset is representative for a quality of a workpiece,
   a computation apparatus, implemented by one or more processors, configured to
      transform the machining dataset into a time-frequency domain to generate a time-frequency domain dataset,
      apply the trained autoencoder function to the time-frequency domain dataset and generate data in the hidden layer, analyze the quality of the workpiece based on the data generated in the hidden layer of the trained autoencoder function, and
a second interface, implemented by one or more processors, providing results of the analysis of the quality of the workpiece, wherein the autoencoder is a variational autoencoder with a specified statistical distribution for the hidden layer, and wherein the analyzing the quality of the workpiece comprises comparing the data generated in the hidden layer of the variational autoencoder with the specified statistical distribution.

* * * * *